United States Patent [19]

Linden et al.

[11] 4,167,420

[45] Sep. 11, 1979

[54] PROCESS FOR DISPERSING PIGMENTS AND FILLERS USING AMINOALKANOLS AND SALT, ALKOXYLATION AND QUATERNIZATION DERIVATIVES THEREOF

[75] Inventors: Heinrich Linden, Düsseldorf; Horst Rutzen, Langenfeld; Bernd Wegemund, Haan, all of Fed. Rep. of Germany

[73] Assignee: Henkel Kommanditgesellschaft auf Aktien (Henkel KGaA), Düsseldorf-Holthausen, Fed. Rep. of Germany

[21] Appl. No.: 930,229

[22] Filed: Aug. 2, 1978

[30] Foreign Application Priority Data

Aug. 26, 1977 [DE] Fed. Rep. of Germany ....... 2738538

[51] Int. Cl.² .................. C09C 1/24; C09C 1/36; C09C 3/05
[52] U.S. Cl. .................. 106/288 B; 106/288 Q; 106/300; 106/304; 106/308 F; 106/308 N; 106/309
[58] Field of Search .................. 106/308 N, 300, 304, 106/308 F, 288 B, 288 Q, 289, 290, 301, 302, 292, 293, 294, 295, 296, 299, 309; 260/404, 404.5

[56] References Cited

U.S. PATENT DOCUMENTS

| 3,457,313 | 7/1969 | Baker | 260/584 R |
|---|---|---|---|
| 3,840,382 | 10/1974 | Burke | 106/308 N |
| 3,891,705 | 6/1975 | Higuchi et al. | 260/584 B |
| 3,928,276 | 12/1975 | Linden et al. | 106/308 N |
| 3,928,422 | 12/1975 | Sundby | 260/584 R |

FOREIGN PATENT DOCUMENTS 1037304  7/1966  United Kingdom ............... 106/308 N Primary Examiner—Helen McCarthy
Attorney, Agent, or Firm—Hammond & Littell

[57] ABSTRACT

A process for improving the dispersibility of inorganic and organic pigments and fillers which comprises contacting said pigments and fillers with (a) a mixture of aminoalkanols of the formulae

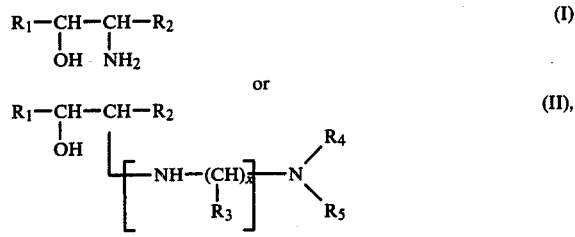

wherein $R_1$ and $R_2$ are alkyl having 1 to 21 carbon atoms, the sum of the carbon atoms in $R_1$ and $R_2$ being 6 to 22, $R_3$ is hydrogen or methyl, provided there is only one methyl group per $(CH)_x$ group, $R_4$ and $R_5$ are the same or different and are hydrogen, alkyl having 1 to 4 carbon atoms or hydroxyalkyl having 2 to 4 carbon atoms, x is an integer of from 2 to 6 and y is 0,1,2 or 3, the $R_1$—CH—CH—$R_2$ units in the aminoalkanols being of at least two different chain lengths of from 8 to 24 carbon atoms and the vicinal substituents being distributed statistically along said chain lengths, with the proviso that, if y is 0, $R_4$ and $R_5$ are not both hydrogen, or (b) salts, (c) alkoxylation products, and (d) quaternization products of said aminoalkanols, and recovering highly dispersible pigments and fillers.

19 Claims, No Drawings

PROCESS FOR DISPERSING PIGMENTS AND FILLERS USING AMINOALKANOLS AND SALT, ALKOXYLATION AND QUATERNIZATION DERIVATIVES THEREOF

FIELD OF THE INVENTION

The present invention relates to the use of aminoalkanol mixtures, salts thereof, products of alkoxylation thereof and products of quaternization thereof, for the treatment of inorganic and organic pigments and fillers in order to improve the dispersibility of the pigments and fillers.

BACKGROUND OF THE INVENTION

The dispersing of pigments and fillers in organic and aqueous media, that is, the destruction of the agglomerates formed from the primary pigment and filler particles, is a work operation required in the production of paints and other pigmented coating agents, which constitutes a considerable cost factor owing to the necessary expenditure of time and energy. This dispersing operation is performed mechanically by means of various machines such as kneaders, cylinder mills and ball mills. In order to shorten this working operation, the pigments or fillers are treated with organic compounds which are intended to decrease the interfacial tension between the pigment or filler granule and the organic or aqueous medium and thus facilitate the dispersion of the pigment or filler. As far as possible, the action of these organic compounds should be limited only to improving dispersibility without attendant negative phenomena.

It is already known from U.S. Pat. No. 1,722,174 to treat inorganic pigments and fillers with stearic acid and resinic acid and ammonium soaps thereof in order to improve the ability of the pigments and fillers to disperse. According to data presented in French Pat. Specification No. 1,276,739, triethanolamine or salts thereof serve the same purpose. Furthermore, aliphatic amines have already been proposed as agents for improving the dispersing effect. When choosing the agents to be used, it has to be borne in mind that many additives are products which are not compatible with lacquer and which, in addition to the desired dispersing effect, also have many undesirable properties such as water-solubility and emulsifying power. Many of them also lead to attendant negative phenomena such as loss of luster of the finished coating and delayed drying during formation of the films.

OBJECTS OF THE INVENTION

An object of the present invention is the development of a process for the production of highly dispersible inorganic or organic pigments and fillers.

Another object of the invention is the development of a process for the production of highly dispersible inorganic or organic pigments and fillers which comprises contacting said pigments and fillers with (a) a mixture of aminoalkanols of the formulae

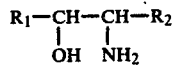

or

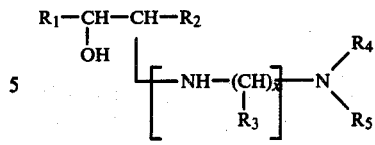

wherein $R_1$ and $R_2$ are alkyl having 1 to 21 carbon atoms, the sum of the carbon atoms in $R_1$ and $R_2$ being 6 to 22, $R_3$ is hydrogen or methyl, provided there is only one methyl group per $(CH)_x$ group, $R_4$ and $R_5$ are the same or different and are hydrogen, alkyl having 1 to 4 carbon atoms or hydroxyalkyl having 2 to 4 carbon atoms, x is an integer of from 2 to 6 and y is 0,1,2 or 3, the $R_1$—CH—CH—$R_2$ units in the aminoalkanols being of at least two different chain lengths of from 8 to 24 carbon atoms and the vicinal substituents being distributed statistically along said chain lengths, with the proviso that, if y is 0, $R_4$ and $R_5$ are not both hydrogen, or (b) salts, (c) alkoxylation products, and (d) quaternization products of said aminoalkanols, and recovering highly dispersible pigments and fillers.

These and other objects of the invention will become more apparent as the description thereof proceeds.

DESCRIPTION OF THE INVENTION

According to the present invention there is provided a method for producing highly dispersed inorganic or organic pigments and fillers, which comprises contacting said pigments and fillers with aminoalkanol mixtures, salts thereof, products of alkoxylation thereof, and products of quaternization thereof. These aminoalkanols and their derivatives can be advantageously used for the treatment of inorganic and organic pigments and fillers, in order to bring about an excellent improvement in the dispersibility of the pigments and fillers in organic and aqueous media.

More particularly, the present invention relates to a method for producing a highly dispersible inorganic or organic pigment or filler, which comprises contacting said inorganic or organic pigment or filler with a member selected from the group consisting of (a) a mixture of vicinal aminoalkanols of the formulae

or

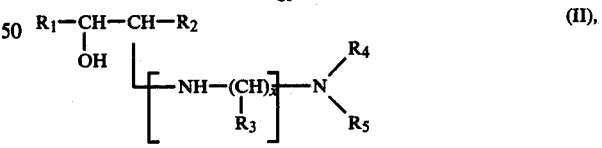

wherein $R_1$ and $R_2$ are independently alkyl having 1 to 21 carbon atoms and the sum of the carbon atoms in $R_1$ and $R_2$ is from 6 to 22 inclusive, $R_3$ is a member selected from the group consisting of hydrogen and methyl, provided that there is only one methyl group per $(CH)_x$ group, $R_4$ and $R_5$ are the same or different and are a member selected from the group consisting of hydrogen, alkyl having 1 to 4 carbon atoms and hydroxyalkyl having 1 to 4 carbon atoms, x is an integer of from 2 to 6 inclusive and y is 0,1,2 or 3, the $R_1$—CH—CH—$R_2$ units in the aminoalkanols being of at least two different chain lengths of from 8 to 24 carbon atoms inclusive, and the vicinal substituents being distributed statistically along said chain lengths, with the proviso that, if y is o, $R_4$ and $R_5$ are not both hydrogen, (b) salts of said aminoalkanols, preferably salts of organic acids, (c) alkoxylation products of said aminoalkanols, preferably with ethylene oxide and/or propylene oxide, and (d) quaternization products of said aminoalkanols, and recovering a highly dispersible pigment or filler.

Mixtures of olefins having 8 to 24 carbon atoms and statistically distributed, non-terminal double bonds are employed in the production of the aminoalkanol mixtures of the present invention. Olefin mixtures of this type are known per se. They can be obtained, for example, by catalytic dehydrogenation or chlorination/dehydrochlorination of $C_8$–$C_{24}$ paraffins and selective extraction of the non-terminal monoolefins. In the monoolefins the double bonds are substantially non-terminal and are distributed statistically along the "backbone" $R_1$—CH—CH—$R_2$ chain. Alternatively, mixtures of olefins of this type with saturated hydrocarbons, such as are obtained during production of these olefins, can be used.

The fractions of non-terminal monoolefins having a high content of linear $C_{11}$–$C_{14}$ or $C_{15}$–$C_{18}$ olefins, particularly those having the following chain length distributions, are preferred:

(a) $C_{11}$–$C_{14}$ Fraction (distribution in weight percent)
$C_{11}$—olefins, approximately 22
$C_{12}$—olefins, approximately 30
$C_{13}$—olefins, approximately 26
$C_{14}$—olefins, approximately 22

(b) $C_{15}$–$C_{18}$ Fraction (distribution in weight percent)
$C_{15}$—olefins, approximately 26
$C_{16}$—olefins, approximately 35
$C_{17}$—olefins, approximately 31
$C_{18}$—olefins, approximately 6

Alternatively, the proportionate chain length distribution can differ from that given above.

For the purpose of producing the products in accordance with the present invention, the olefin mixtures are first epoxidized by known methods, e.g. by reaction with peracids like peracetic acid.

In order to obtain the products of Formula (I), to be used in accordance with the present invention, the epoxide mixtures obtained are reacted with ammonia in the presence of water at an elevated temperature and elevated autogenous pressure.

The ammonia is used in a 5- to 20-fold, preferably in a 10- to 15-fold, molar excess, relative to the epoxide mixture used, while the water is added in a 1-fold to 20-fold, preferably 5- to 15-fold, molar amount, again relative to the epoxide mixture.

Reaction is effected in an agitating autoclave at a temperature of from 160° to 220° C., preferably from 190° to 210° C., a pressure of approximately 40 to 150 atmospheres being established.

The period of time for performing the reaction can be from 0.25 to 10 hours, preferably 0.5 to 1 hour.

Due to the phase separation of the product- and ammonia/water phases, the product phase is extracted during the working-up of the reaction mixture and it is purified by known methods, such as by distillation.

In order to obtain the aminoalkanol mixtures, of Formula (II), to be used in accordance with the present invention, the epoxide mixtures obtained are reacted with mono-, di-, tri- or tetraamines of the formula

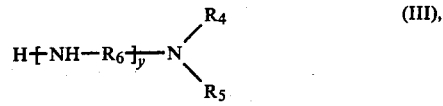

wherein $R_6$ is straight-chain alkylene having 2 to 6 carbon atoms, which can be substituted by a methyl group, and $R_4$, $R_5$ and y are as defined above.

Amine compounds suitable for the reaction are, for example, ethylenediamine, 1,3-propylene diamine, hexamethylene diamine, N-methyl-1,2-propylene diamine, N,N-diethylethylene diamine, N,N-dimethyl-1,3-propylene diamine, N-propylhexamethylene diamine, N-ethanol-ethylene diamine, N,N-diethanolethylene diamine, diethylene triamine, di-1,3-propylene triamine, di-1,2-propylene triamine, di-hexamethylene triamine, N,N-dimethyldiethylene triamine, and N-ethyl-di-1,3-propylene triamine and triethylene tetraamine.

The amines are used in a 1.0- to 15-fold molar amount, relative to the epoxide mixture, and, in the case where they are fluid at room temperature, can at the same time be used as solvents. If necessary, a further catalytically active solvent, preferably water, ethanol or glycerine, can be additionally used.

Reaction is effected in a temperature range of from 100° to 230° C., at, for example, the reflux temperature of the amine or solvent used. If the boiling point of the di- or triamines lies below the required reaction temperature, or a low-boiling catalyst is to be used, the reaction may also be performed under pressure in an autoclave at temperatures of from 150° C. to 230° C.

Alternatively, in a preferred embodiment, the reaction with amines, which the radicals $R_4$ and $R_5$ are not hydrogen, can be performed without pressure when their boiling point lies below the desired reaction temperature. In this embodiment, the epoxide mixture is combined with a quantity of 0.1 to 0.5 mole of glycerine or glycol, relative to the epoxide mixture, at a reaction temperature of 150° to 220° C., and a 1.0- to 1.5-fold molar quantity of the low-boiling diamine, relative to the epoxide mixture used, is slowly added, so that the temperature does not drop more than 10° C. to 20° C. below the initially adjusted reaction temperature. The mixture is subsequently agitated for 1 to 2 hours at reflux temperature. After the reaction has ended, the catalyst is washed out with water or distilled off.

The time required for performing the reaction can vary over a wide range and can be, for example, approximately 1 to 50 hours, preferably 1 to 5 hours.

The reaction mixture can be worked up by known methods, such as by distillation.

The salts to be used in accordance with the present invention can be prepared by currently available methods. The salts used are preferably salts of the aminoalkanol mixtures with aliphatic carboxylic acids having 2 to 24 carbon atoms. Saturated and unsaturated, straight chain and branched chain aliphatic carboxylic acids having 2 to 24 carbon atoms in the molecule, which optionally can be substituted by hydroxyl groups, can serve as the acid component for producing the salts. The acid component of the salts of the invention thus includes alkanoic, alkenoic and alkadienoic acids, which optionally can be substituted by hydroxyl groups as well as mixtures thereof. Suitable hydroxy-substituted acids are the mono-hydroxy alkanoic and alkenoic acids. Examples of aliphatic carboxylic acids which are useful as the acid component of the salts to be used in accordance with the present invention are acetic acid, butyric acid, caproic acid, lauric acid, palmitic acid, behenic acid, myristoleic acid, oleic acid, soya oil fatty acid, linoleic acid, and lactic acid. The salts of butyric acid, caproic acid and soya oil fatty acid are preferred.

The products of alkoxylation of the aminoalkanol mixtures, to be used in accordance with the present invention, are produced by known methods by the addition of alkylene oxides in the presence of alkaline catalysts. This primarily involves the addition of ethylene oxide and/or 1,2-propylene oxide, preferably ethylene oxide. The degree of alkoxylation can vary within wide limits, as, for example, between 2 to 50 moles of alkylene oxide per mole of aminoalkanol. For example, the degree of ethoxylation in the case of ethylene oxide lies between 2 to 50, preferably 5 to 35, moles of ethylene oxide per mole aminoalkanol.

The products of quaternization of the aminoalkanol mixtures, to be used in accordance with the present invention, can be obtained in a known manner by reacting the vicinal hydroxyamines with an alkylating agent, such as, for example, benzyl chloride, ethyl bromide, methyl chloride, and dimethyl sulfate.

The dispersing agents of the invention thus include quaternary ammonium salts of the formula

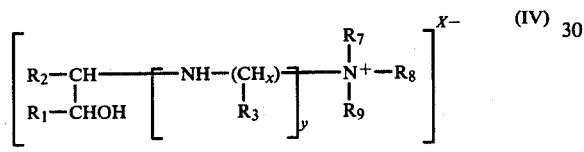

wherein $R_7$ is alkyl having 1 to 4 carbon atoms or hydroxyalkyl having 2 to 4 carbon atoms, $R_8$ is alkyl having 1 to 4 carbon atoms, hydroxyalkyl having 2 to 4 carbon atoms or benzyl, $R_9$ is alkyl having 1 to 4 carbon atoms or benzyl, $X^-$ is a salt-forming anion, and $R_1$, $R_2$, x and y are as defined above. The salt-forming anion $X^-$ is preferably $Cl^-$, $Br^-$, $I^-$ or methosulfate, more preferably $Cl^-$.

In the present treatment of the inorganic or organic pigments and fillers to improve their dispersibility in organic and aqueous media, the aminoalkanol mixtures, salts thereof, products of alkoxylation thereof, and products of quaternization thereof, are used in quantities of 0.1 to 5 percent by weight, preferably 0.2 to 2 percent by weight, relative to the weight of the pigment or filler to be coated in the process. This quantity of aminoalkanols or their derivatives is also the quantity which is applied to the pigment or the filler by virtue of the performance of the coating process of the present invention.

The coating process of the present invention is generally applicable for the treatment of inorganic or organic pigments and fillers. Most of said pigments and fillers are suitable as substrates to be coated. Examples of pigments to be coated in accordance with the process of the present invention are titanium dioxide, zinc sulfide, lithopone, zinc oxide, cadmium sulfoselenide, iron oxide, chrome-tin, cadmium mercury, chromium oxide, zinc chromate, cadmium sulfide, dianisidine, pyranthrone, isoindolinone RK anthanthrone, GR perinone, flavanthrone, anthrapyrimidine, nickel-azo yellow, phthalocyanine, indanthrone, carbon black, bone black, etc.

Examples of fillers to be coated in accordance with the process of the present invention are calcium carbonate, aluminum oxide, aluminum, calcium silicate, barium sulfate, diatomaceous earth, carbon black, beryllium oxide, barium ferrite, cork, talc, comminuted polymer fillers, elastomer-plastics blends, wood flour, shell flour, silica aerogel, kaolinite, asbestos, mica, aluminum silicate, etc. Particularly good results are obtained when titanium dioxide pigments and iron oxide pigments are treated in accordance with the present invention. Coating can be effected in a variety of ways. For example, coating can be effected during the course of production of the pigment, such as during the grinding process where the liquid pigment suspension is subjected to the action of ball mills, pinned disc mills, or steam-jet mills, by treating the damp pigment filter cake, and also by treating the finished product pigment or filler.

It is, therefore, irrelevant whether the pigments have already been subjected to inorganic after-treatment, as is frequently the case with, for example, titanium dioxide, which has been after-treated by precipitation of aluminum oxide and/or silicon dioxide.

In the process of the present invention, for the treatment of inorganic or organic pigments and fillers, the aminoalkanol mixtures, salts thereof or products of alkoxylation and products of quaternization thereof can be used directly as such, as aqueous suspensions, possibly with the joint use of suitable surfactants, or as solutions in organic solvents such as benzine, or mixtures of ethanol or benzine.

When surfactants are jointly used to produce the aqueous suspensions of the aminoalkanol mixtures and derivatives thereof, to be used in accordance with the present invention, special care has to be taken that the surfactants used do not have any detrimental effects on the properties of the coating agents and the films produced therewith. The aqueous suspension or organic solvent solution employed in the coating process of the invention can advantageously contain approximately 1.5 to 3 parts by weight of water or organic solvent, respectively, to one part by weight of pigment or filler to be treated. The coating step is suitably conducted at a temperature between about 20° and 40° C., very advantageously at room temperature. The pigments or fillers are contacted with the aminoalkanol mixtures or derivatives thereof used in accordance with the present invention for a time sufficient to ensure good coating and subsequent improved dispersibility. The treatment time required in any given case can be readily determined through routine experimentation. The coating operation can advantageously be performed, for example, by agitation together of the pigment or filler to be coated and a solution or aqueous suspension of the aminoalkanol mixture or derivative thereof of the invention for a period of about ¼ hour to 2 hours.

The present invention will now be further illustrated by way of the following examples and comparative experiments, without, however, it being limited thereto.

EXAMPLE 1

A titanium dioxide of the rutile type (commercial product "Bayertitan R-U-2"), produced by the sulfate method, and inorganically after-treated by precipitation of aluminum oxide, was used as the pigment to be coated. Organic coating was effected using a mixture of vicinal hydroxyamines having alkyl chains of from $C_{15}$ to $C_{18}$ chain length and derived from olefins having a statistically distributed, non-terminal double bond, said mixture being produced in the following manner:

14.9 kg (0.828 kmole) of water, a 14.1 kg (0.829 kmole) of liquid ammonia and 16.2 kg (0.0552 kmole) of i-$C_{15/18}$ epoxide (non-terminal epoxide) were introduced into an autoclave. The mixture was heated to 200° C. with agitation and was maintained at this temperature for 2 hours. A pressure of 90 atmospheres gauge pressure was established. The aqueous phase was drawn off after cooling to 50° C. and was disposed of, and the amine phase was dried at 1 torr and 150° C. The yield was 14.9 kg or 87.1% of theory, amine number 200; hydroxyl number 406; epoxide number 0.1.

The titanium dioxide was coated with a solution of 0.7 gm of the above hydroxy amine mixture in a mixture of 20 gm of ethanol and 180 gm of light benzine having a boiling point of 60° to 95° C.

100 gm of titanium dioxide were intensively agitated with 200 gm of the solution for ½ hour, and the solvent was subsequently distilled off at approximately 80° C. under application of a vacuum (water-jet pump).

The pigment coated in this manner was tested by the following method, the untreated titanium dioxide being included for the purpose of comparison.

A dispersion of both the coated and uncoated pigment was made up by agitation for a period of 60 minutes of the following dispersing mixtures shown in TABLE I in a mechanical shaker (so-called "Paint Conditioner", Model 5100, manufactured by the firm Red Devil/U.S.A.) in 250 ml wide-necked flasks charged with 75 gm of glass beads having a diameter of 3 mm.

TABLE I

| Dispersing preparation or lacquer | a | b (control experiment) |
|---|---|---|
| Titanium dioxide | 18.126 gm | 18.000 gm |
| Quantity of coating material in %, relative to pigment | 0.7 | None |
| Air-drying alkyd resin with 48% oil, 55% in xylene - test benzine (= commercial product Alkydal F-48 manufactured by the firm Bayer) | 24.0 gm | 24.0 gm |
| Test benzine | 10.0 gm | 10.0 gm |
| Xylene | 1.4 gm | 1.4 gm |

Each of the preparations of TABLE I was lacquered under agitation with 80 gm of the following mixture to form the finished paint.

| | |
|---|---|
| 72.0 | gm of alkyd resin (as above) |
| 2.0 | gm of test benzine |
| 1.4 | gm of xylene |
| 1.0 | gm of silicon oil (1% in xylene - Type AK 35 manufactured by the firm Wacker) |
| 1.46 | gm of lead octoate (24% Pb) |
| 0.46 | gm of cobalt octoate (6% Co) |
| 0.28 | gm of manganese octoate (6% Mn) |
| 1.4 | gm of methyl ethyl ketoxime (55% in test benzine) |
| 80.0 | gm |

14.2 gms of the following dispersed black paste were added to the lacquer thus obtained, and the mixture was homogenized.
18 gm of soot (Flammruss 101, Degussa—so-called "Lamp Black")
180 gm of alkyd resin (as above)
60 gm of test benzine
26 gm of xylene The tinted lacquers produced were applied to glass plates by means of a draw straightedge of 100 μm and, after drying, the reflectance value was determined at 420 nm by means of the colorimeter PM Q II manufactured by the firm C. Zeiss. A higher reflectance value is tantamount to a greater brightening capacity which is contingent on improved dispersion of the white pigment. For the purpose of comparison, the titanium dioxide used was coated with 0.7% of a coconut amine (amine number=285) and a lacquer containing this coated titanium dioxide was prepared as above (designated lacquer C) and included in the test of reflectance values. The following reflectance values shown in TABLE II were obtained.

TABLE II

| Lacquer | Coating | Reflectance Value at 420 nm |
|---|---|---|
| (a) | 0.7% hydroxyamine | 31.4 |
| (b) | None (control experiment) | 30.8 |
| (c) | 0.7% coconut amine (comparison test) | 31.0 |

It can be seen from the values obtained that the brightness and thus the dispersion are considerably improved by coating with 0.7% of hydroxyamine in accordance with the present invention. On the other hand, the coconut amine used for comparison was only slightly effective.

EXAMPLE 2

21.8 kg (0.207 kmole) of technical diethanolamine were heated to 200° C. with agitation under a flow of nitrogen, and 37.4 kg (0.173 kmole) of i-$C_{11/14}$ epoxide (non-terminal epoxide) were added within 30 minutes.

The temperature was maintained at 200° C. for 4 hours with intensive agitation, and 8.1 kg of forerun were distilled off at 2 torr and up to 180° C. kettle temperature. The yield was 49.5 kg or 89% of theory; amine number 197.

Titanium dioxide of the rutile type was coated with 0.7% by weight of this hydroxyamine mixture in accordance with the method given in Example 1. The coated pigment was then tested in accordance with the procedure given in Example 1. The tinted lacquer thus produced had a reflectance value of 32.4 at 420 nm (blank value 30.8).

EXAMPLE 3

750 gm (2.8 moles) of i-$C_{15-18}$ epoxide (non-terminal epoxide) were heated with agitation to 220° C. under a flow of nitrogen, and 29 gm (0.25 mole) of hexamethylene diamine were added dropwise within 30 minutes. After a reaction time of 17 hours, the excess epoxide was distilled off up to a liquid temperature of 212° C. at 0.5 mbar. The yield was 153 gm or 93.9% of theory, amine number 191.

Titanium dioxide of the rutile type was coated with 0.8% by weight of this hydroxyamine mixture in accordance with the method given in Example 1. The coated pigment was then tested in accordance with the procedure given in Example 1. The tinted lacquer thus produced had a reflectance value of 31.5 at 420 nm (blank value 30.8).

EXAMPLE 4

2.4 gm of a 30% methanolic sodium methylate solution were added to 285.1 gm (1 mole) of the hydroxyamine mixture produced in accordance with Example 2, and the mixture was heated to 100° C. and distilled for a short period of time in order to remove the methanol. 220 gm (5 moles) of ethylene oxide were added and the mixture was heated to 158° C. for 3 hours, a final pressure of 4 atmospheres gauge pressure being established. The yield was 505 gm, amine number 118.

Titanium dioxide of the rutile type was coated with 0.5% by weight of this product of ethoxylation of the hydroxyamine mixture in accordance with the method given in Example 1. The coated pigment was then tested in accordance with the procedure given in Example 1. The tinted lacquer thus produced had a reflectance value of 31.5 at 420 nm (blank value 30.8).

EXAMPLE 5

208.5 gm (1 mole) of the hydroxyamine mixture produced in accordance with Example 1 were neutralized with 278 gm (1 mole) of a fatty acid produced from soya oil (acid number=202, iodine number=140).

Titanium dioxide of the rutile type was coated with 0.5% by weight of this fatty acid salt of the hydroxyamine mixture in accordance with the method given in Example 1. The coated pigment was then tested in accordance with the procedure given in Example 1. The tinted lacquer thus produced had a reflectance value of 31.5 at 420 nm (blank value 30.8).

EXAMPLE 6

The ethoxylation product of the hydroxyamine mixture produced in accordance with Example 4 was applied in a quantity of 1 percent by weight to a commercially available, bluish-tinted red iron oxide (type 120 F manufactured by the firm Bayer AG) in accordance with the coating procedure given in Example 1. The dispersibility of the treated and untreated pigment in an aqueous medium was tested in the following manner:

(a) Preparation of Colored Paste 100 gm of an aqueous 1 percent by weight hydroxyethyl cellulose solution (commercial product Natrasol 250 HR of the firm Hercules) were weighed into a 250 ml beaker (diameter: 6 cm; height: 11 cm). 60 gm of the coated pigment was added and was stirred in manually by means of a glass rod. Dispersion was effected by means of an agitator whose shaft was provided with a toothed disc with a 4 cm diameter. The agitating disc was immersed centrally into the pigment paste to the point where the disc was at a distance of approximately 1 cm from the bottom of the beaker. Dispersion was subsequently effected by agitation for 5 minutes at 1200 rpm.

(b) Preparation of Dispersion Paint

The following substances were dispersed for 20 minutes by means of a rapid agitator (dissolver type) at approximately 5000 rpm:
45 gm of water
45 gm of methylhydroxypropylcellulose, 2% by weight in water (type Culminal PK 82, Henkel)
8 gm of sodium hexametaphosphate, 10% by weight in water
140 gm of titanium dioxide (type RN 56, Kronos Titangesellschaft, Leverkusen)
12 gm of calcite (type BLP2, Omya, Cologne)
18 gm of micro talc (type AT extra, Norwegian Talc)
320 gm of barite (type EWO 423, normal, R. Alberti, Bad Lauterberg)
1 gm of preservative (Dehygant B, Henkel)
3 gm of anti-foaming agent (Dehydran C, Henkel)
12 gm of ethylene glycol acetate.
Into this dispersion were stirred
350 gm of an aqueous plastics material dispersion (53% by weight dispersion of a copolymer of vinyl acetate (Mowilith DM 5, Hoechst) and
45 gm of methylhydroxypropylcellulose solution (as above)

(c) Shading 100 gm of the dispersion paint (b) and 10 gm of colored paste (a) were intimately mixed by hand in a 250 ml plastics material beaker by means of a glass rod. The tinted paint was drawn out on a glass plate by means of a drawing box having a gap height of 150 μm and a width of 6 cm. The same operation was effected with a non-treated iron oxide red.

After the films were dried, their reflectance value was determined by means of the colorimeter PMQ II (C. ZEISS) at 420 nm. A lower reflectance value is tantamount to a greater coloring capacity of the colored paste. The following reflectance values were obtained:
Coated iron oxide red=22.4
Non-coated iron oxide red=23.8

EXAMPLE 7

A hydroxyamine mixture was produced from technical monoethanolamine and i-$C_{11/14}$ epoxide (non-terminal epoxide) in accordance with the procedure given in Example 2. This hydroxyamine mixture was subsequently reacted with ethylene oxide in the ratio of 35 moles of ethylene oxide per mole of hydroxyamine by the method of Example 4.

This product of ethoxylation of the hydroxyamine mixture was applied in a quantity of 1.2 percent by weight to a commercially available, bluish-tinted iron oxide red (type 120 of the firm Bayer AG) in accordance with coating procedure of Example 1. The dispersibility of the treated and untreated pigment was tested in a dispersion paint in the manner described in Example 6. After the films had dried, the reflectance values were measured at 420 nm and the following reflectance values were obtained:
Coated iron oxide red=21.9
Non-coated iron oxide red=23.8

The preceding specific embodiments are illustrative of the practice of the invention. It is to be understood, however, that other expedients known to those skilled in the art, or disclosed herein may be employed without departing from the spirit of the invention or the scope of the appended claims.

We claim:
1. In a process for treating inorganic or organic pigments and fillers with a dispersing agent in order to improve their dispersibility in organic and aqueous media, the improvement comprising utilizing as the dispersing agent a member selected from the group consisting of
(a) a mixture of vicinal aminoalkanols of the formulae

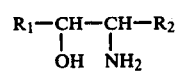

or

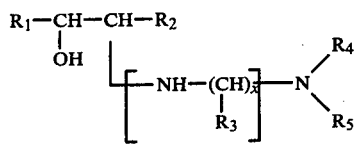

wherein $R_1$ and $R_2$ are independently alkyl having 1 to 21 carbon atoms and the sum of the carbon atoms in $R_1$ and $R_2$ is from 6 to 22 inclusive, $R_3$ is a member selected from the group consisting of hydrogen and methyl, provided that there is only one methyl group per $(CH)_x$ group $R_4$ and $R_5$ are the same or different and are a member selected from the group consisting of hydrogen, alkyl having 1 to 4 carbon atoms and hydroxyalkyl having 2 to 4 carbon atoms, x is an integer of from 2 to 6 inclusive and y is 0, 1, 2 or 3, the

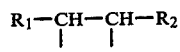

units in the aminoalkanols being of at least two different chain lengths of from 8 to 24 carbon atoms inclusive, and the vicinal substituents being distributed statistically along said chain lengths, with the proviso that, if y is 0, $R_4$ and $R_5$ are not both hydrogen,
 (b) salts of said aminoalkanols,
 (c) alkoxylation products of said aminoalkanols with ethylene oxide and/or propylene oxide, and
 (d) quaternization products of said aminoalkanols.

2. The process of claim 1, wherein the dispersing agent is a mixture of vicinal aminoalkanols of the formula (I).

3. The process of claim 1, wherein the dispersing agent is a mixture of vicinal aminoalkanols of the formula (II).

4. The process of claim 1, wherein the salts of said aminoalkanols are salts of organic acids.

5. The process of claim 1, wherein the salts of said aminoalkanols are salts of aliphatic carboxylic acids having 2 to 24 carbon atoms.

6. The process of claim 5, wherein the salts are of aliphatic carboxylic acids selected from the group consisting of alkanoic acids, alkenoic acids, and alkadienoic acids, which optionally can be substituted by hydroxyl groups, and mixtures thereof.

7. The process of claim 1, wherein the salts of said aminoalkanols are salts of butyric acid, caproic acid or soya oil fatty acid.

8. The process of claim 1, wherein the alkoxylation products of said aminoalkanols are ethoxylation products formed by addition of ethylene oxide, which have a degree of ethoxylation of 2 to 50 moles of ethylene oxide per mole of aminoalkanol.

9. The process of claim 8, wherein the degree of ethoxylation is 5 to 35 moles of ethylene oxide per mole of aminoalkanol.

10. The process of claim 1, wherein the quaternization products of said aminoalkanols are quaternization products formed with benzyl chloride, ethyl bromide, methyl chloride or dimethyl sulfate.

11. The process of claim 1, wherein the dispersing agent is a mixture of vicinal aminoalkanols wherein the

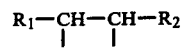

units have the following chain length distribution:

| Carbon Atoms in Chain | Distribution in Weight Percent (Approximate) |
|---|---|
| 11 | 22 |
| 12 | 30 |
| 13 | 26 |
| 14 | 22 |

12. The process of claim 1, wherein the dispersing agent is a mixture of vicinal aminoalkanols wherein the

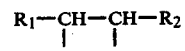

units have the following chain length distribution:

| Carbon Atoms in Chain | Distribution in Weight Percent (Approximate) |
|---|---|
| 15 | 26 |
| 16 | 35 |
| 17 | 31 |
| 18 | 6 |

13. The process of claim 1, wherein the dispersing agent is used in an amount of 0.1 to 5 percent by weight, relative to the weight of the pigment or filler to be treated.

14. The process of claim 1, wherein the dispersing agent is used in an amount of 0.2 to 2 percent by weight, relative to the weight of the pigment or filler to be treated.

15. The process of claim 1, wherein the pigment is a titanium dioxide pigment.

16. The process of claim 1, wherein the pigment is an iron oxide pigment.

17. An inorganic or organic pigment or filler treated by the process of claim 1.

18. Titanium dioxide treated by the process of claim 1.

19. Iron oxide pigment treated by the process of claim 1.